United States Patent [19]

Burl

[11] Patent Number: 5,633,956
[45] Date of Patent: May 27, 1997

[54] VIDEO IMAGE PROCESSING

[75] Inventor: Michael Burl, Twickenham, United Kingdom

[73] Assignee: British Broadcasting Corporation, London, United Kingdom

[21] Appl. No.: 290,968
[22] PCT Filed: Feb. 26, 1993
[86] PCT No.: PCT/GB93/00402
  § 371 Date: Sep. 29, 1994
  § 102(e) Date: Sep. 29, 1994
[87] PCT Pub. No.: WO93/17520
  PCT Pub. Date: Sep. 2, 1993

[30] Foreign Application Priority Data

Feb. 26, 1992 [GB] United Kingdom ............... 9204115

[51] Int. Cl.$^6$ ............................................. G06K 9/40
[52] U.S. Cl. ................................. 382/275; 348/452
[58] Field of Search .................... 348/402, 407, 348/412, 413, 414, 415, 416, 417, 418, 452; 382/232, 236, 238, 253, 275

[56] References Cited

U.S. PATENT DOCUMENTS

| 4,651,207 | 3/1987 | Bergmann et al. | 358/402 |
|---|---|---|---|
| 4,864,394 | 9/1989 | Gillard | 348/416 |
| 5,068,727 | 11/1991 | Haghiri et al. | 348/412 |
| 5,134,480 | 7/1992 | Wang et al. | 348/452 |

FOREIGN PATENT DOCUMENTS 2191359  12/1987  United Kingdom ............. H04N 5/14

OTHER PUBLICATIONS

"A Combination of DPCM and Motion–Compensated Frame Interpolation for the Encoding of 34 Mbit/s Colour TV Signals", Frequenz, vol. 42, No. 8, pp. 217–222, Grotz et al., Aug. 1988.

"Coding Color Image Sequences at 64 kbit/s—A New Approach for an ISDN–Videophone (Part III)" Frequenz, vol. 43, No. 5, pp. 126–133, Gilge et al., May, 1989.

Primary Examiner—Jose L. Couso
Attorney, Agent, or Firm—Milton Oliver

[57] ABSTRACT

In a digital video display system, a composite time-compensated video picture, generated from a plurality of input fields, includes discontinuities, e.g. aliases resulting from relative movement of a foreground object and a background. These discontinuities are the results of time-projections from the sequential input fields or frames, which include movement of objects between the respective instants of the frames. These discontinuities are detected and are smoothed by a softening filter, in order to improve the quality of the resulting output image. In a preferred embodiment, the filtering is applied directionally, based on the nature of the discontinuity detected.

11 Claims, 2 Drawing Sheets

"AIR BRUSH" FILTER

VIDEO IMAGE PROCESSING

FIELD OF THE INVENTION

This invention relates to video image processing and in particular to picture creation with motion compensation image processing.

BACKGROUND

Various aspects of motion compensation are described in our British Patent Applications Nos. 9020498.3 and 9111348.0 which describe systems capable of generating intermediate fields of video image sequences where the original sequence of images includes motion of, for example, a foreground object moving over a background. Such intermediate fields are required when producing slow motion sequences or for standards conversion.

In many applications of motion compensation an output image is created by cutting and pasting one or more parts of various video images onto a background. The parts of the video images may include motion within themselves and the parts as a whole may be moving over the background.

When such cutting and pasting techniques are used visible discontinuities are often produced in the output image when there is a sharp transition from foreground image to background image. These discontinuities are referred to as 'aliases' and the problem of these is well known in picture creation systems. They are removed from pictures by use of 'anti-aliasing' techniques which blend the foreground and background pictures together over a few pixels.

SUMMARY OF THE INVENTION

Preferred embodiments of the present invention provide a system which detects these discontinuities in ouput images and then blends the foreground and background images together over a few pixels.

BRIEF FIGURE DESCRIPTION

The invention will now be described in detail by way of example with reference to the accompanying drawings in which.

DETAILED DESCRIPTION

A discontinuity does not occur if an area of the picture is simply shifted, i.e. all of the image was moved by the same amount.

A discontinuity will however occur if the shift between two adjacent elements of a picture is different.

The shift applied to a picture element (pixel) is the motion velocity of that pixel multiplied by time between the input and output pictures. In regions of obscured and revealed background i.e. moving foreground object, the time vector is distorted so that parts of the image are taken from either the input field before or the input field after the output field time. This is called the cross-fade signal.

In a two field motion compensation algorithm the output picture is made from two sequential input fields and two motion vector fields. The two vector fields are associated with the forward projection of the earlier input fields and the backward projection of the following picture field.

The first step in identifying a discontinuity in an output field is to calculate the displacement from the velocity vectors multiplied by the distance in time. This displacement is termed the shift field and is then passed to a small two dimensional differentiating filter to look for transitions in the shift field. If the output of the filter is above a predetermined threshold then a discontinuity has been found. The threshold is set at a level of say half a pixel. A low pass filter is then applied to the discontinuity to soften the transition between the two pictures. This softening is equivalent to a blending of the two pictures by taking different proportions of each image when generating a pixel.

The softening filter only operates on significant fractures in the picture. Tiny differences between various measurements of the same motion are invisible in the output picture and the unnecessary use of a blurring filter may do more damage than good.

Figure 1:
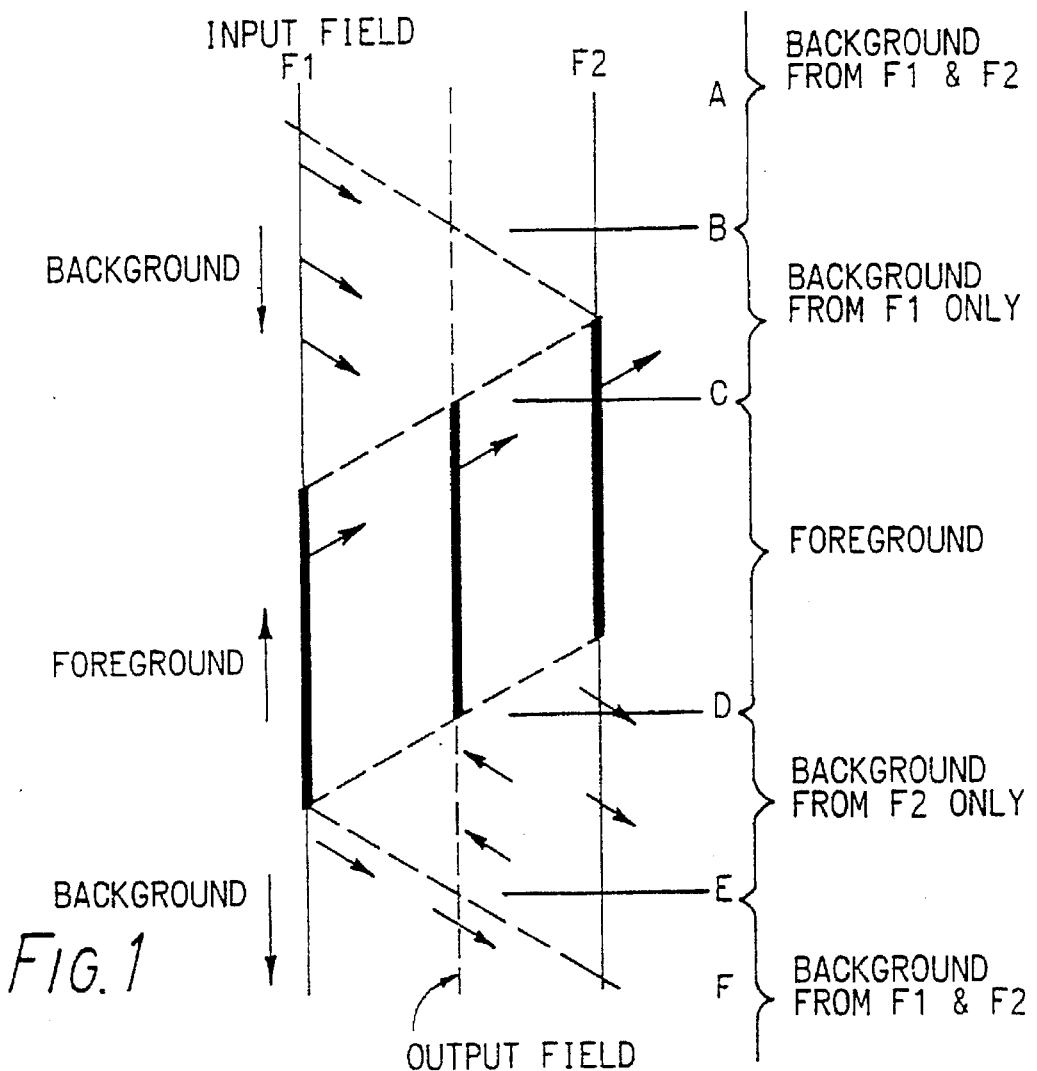
FIG. 1 shows two input fields from an original video sequence with an Intermediate ouput field.

FIG. 1 shows the situation of a foreground object moving upwards and the background moving downwards. Several different situations arise and these are described below:

1) A-B Background is visible in both input pictures and both input pictures contribute to the output picture.
2) B-C Background is only visible in the first picture F1, and the output picture is taken from F1 only. At point B there is no change in the forward projection fields but there is in the backward shift fields from F2. The switch at point B is only visible if camera lag has blurred the foreground object.
3) C-D Foreground is visible in F1 and F2 and output pictures take information from both. At point C there is a change in both the forwards shift field and in the backwards shift field. This can give a visible discontinuity in the output picture and softening may be required.
4) D-E Background is only visible in the second picture F1, the output picture is taken from F2 only. At point D there is a change in both the forwards shift field and in the backwards shift field. This can give a visible discontinuity in the output picture.
5) E-F Background is visible in both pictures and both input pictures contribute to the output picture. At point E there is no change in the backwards shift fields bun there is in the forwards shift field. The switch at point E is only visible if camera lag has blurred the forground object.

The technique used detects the cut and paste edges in the picture and applies filtering subject to the probability of the edges being visible i.e. aliases being present.

In picture creation the output picture is made from the weighted sum of two input pictures. At an output time close to an input time the picture is made primarily from the nearest field in time. The nearest field is unlikely to have many positional fractures because the picture elements have not yet moved far. However, the further field is quite likely to have fractures but the contribution from this field is less because it is further away in time. In the limit, if the output picture is co-timed with the input picture then there is no fracture in the output picture as the input pictures makes 100% of the output picture. There are, however, lots of fractures in the other picture but that makes 0% of the output.

Another rule is used to stop the low pass filter being applied to perfectly good output. According to this rule there is a fracture existing in the output picture if there is a fracture in the displacement field belonging to an input picture and the contribution from that picture is more than F% (F may be set to about 20% but this can be optimised for a particular application).

There are therefore three reasons why there may be a visible fracture in an output picture:

1) There is a fracture from the first displacement field and its contribution is above F%.
2) There is a fracture from the second displacement field and its contribution is above F%.
3) There is a change in the cross-fade factor greater than C% at the output field.

Since any one may cause a visible fracture the low pass filter is assumed to be necessary. The filter itself is a very small aperture and the side effect is quite small but quite effective at breaking up the sharp discontinuities caused by cut and paste.

The pictures are built the way described in previous work but in addition the complete picture is passed to a three by three tap low-pass filter. A switch signal is derived in the way outlined above and is used to select either sharp unfiltered picture or the softer filtered picture. The switch signal along a fracture line is normally only a few pixels wide, say six at the most, so that the area of the picture affected by the airbrush filter is a minimum. It is difficult to see the effect of the filter on picture sharpness because it may affect only two or three samples.

Figure 2:
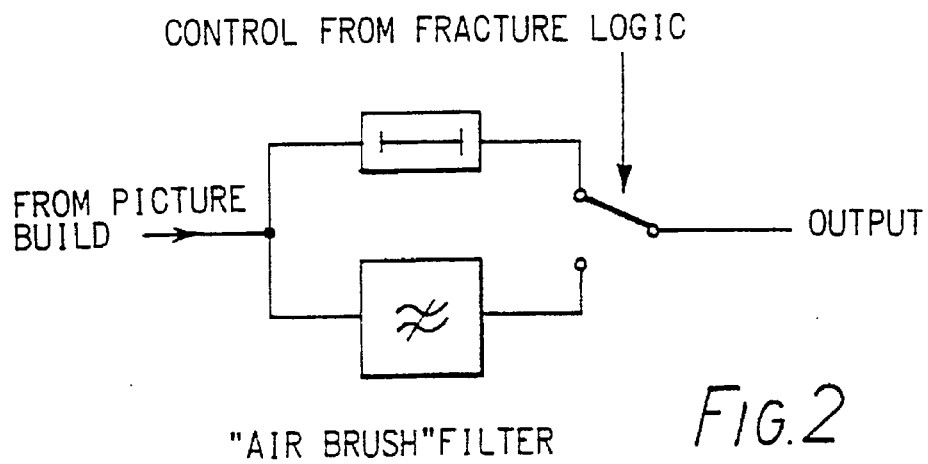
FIG. 2 shows circuit for removing discontinuities from the output field.

FIG. 2 shows the arrangement of the low-pass filter and switch. A delay to match any delay introduced by the filter is provided in parallel for unfiltered output.

The system described can be applied to any system which uses motion compensation.

Figure 3:
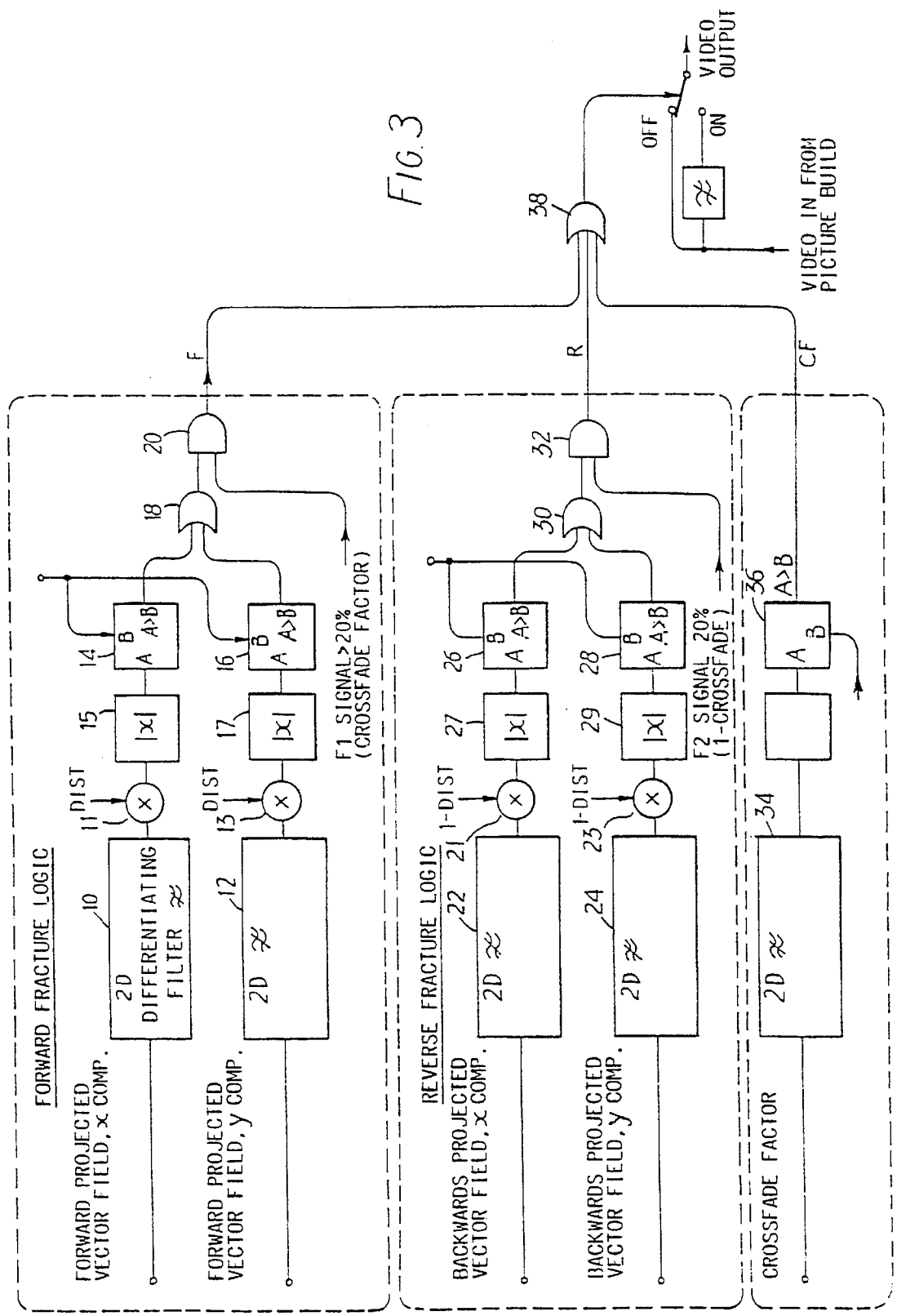
FIG. 3 shows a more complex circuit embodying the invention.

FIG. 3 shows a more sophisticated embodiment of the invention. This embodiment searches for five different types of fracture and performs softening if one of these is detected. The five types are x and y directional fractures in data from a forward projected vector field, x and y fractures in data form a reverse projected vector field. And finally fractures in crossfaded areas of the picture. Thus forward fracture logic, reverse fracture logic, and crossfade fracture logic are shown.

The forward and reverse projected vector fields are derived as follows. Vectors are assigned to each elementary area of the input fields for forward and reverse projection. These vectors are then assigned to elementary areas of an output field in a shifted vector field by multiplying them by the distance to the output field to give a total displacement which is then added to the base address of the pixel assigned to that vector in the input field. The shifted vector field thus comprises a set of unscaled vectors each assigned to an elementary area of the output field.

The x and y components of a forward projected vector field are each put through 2D differentiating filters 10 and 12 respectively. This generates a signal, in each case, whose magnitude is dependent upon the difference between vectors assigned to adjacent elementary areas (or pixels) of the picture.

The output of the differentiating filters is then scaled in multipliers 11 and 13 which multiply the differential by the distance of the output field from the input field. This is necessary to determine the size of the fracture. Any sign changes in the differentials are then removed in the modulus detectors 15 and 17.

A pair of threshold detectors 14 and 16 receive the outputs of these modulus detectors and if the output of either is above a threshold B, i.e. a discontinuity above a predetermined value has been detected, then a control signal is generated at the output of the respective detector.

The control signals at the outputs of the two detectors are passed to an OR gate 18 which generates an output if a signal is produced by either detector.

The output of the OR gate then forms one input to gate 20. The other input receives the crossfade factor between the input fields. If F1, which is the proportion of the output field generated by the forward projected input field, is greater than 20%, then the AND gate 20 will produce an output labelled F when a discontinuity is detected. Further 2D filters 22 and 24, multipliers 21 and 23, modulus detectors 27 and 29, threshold detectors 26 and 28, an OR gate 30, and an AND gate 32 operate on the backwards projected vector fields. For the reverse projected field the outputs of the differentiating filters 22 and 27 are multiplied by 1 minus distance from the input field. F2, the proportion of the output field generated by the backwards projected vector field is 1-CROSSFADE FACTOR. The AND gate 32 has an output labelled R which is generated when a discontinuity is detected.

Changes in the crossfade factor due to movement in the picture revealing and obscuring background are detected in a further 2D filter 34. This produces a signal CF from a threshold detector 36 when the threshold is exceeded.

The multipliers may be omitted by varying the thresholds of the threshold detectors in dependence on the distance of the output field from the input field and storing a scaled vector in the shifted vector field.

The signals F, R, and CF all form inputs to an OR gate 38 and the presence of any one of them generates an output which controls a switch 40 to switch an input video signal through an airbrush filter 40. (see FIG. 2).

The 2D differentiating filters used are typically 5-tap filters and give a weighting of 4 to the central pixel and weightings of −1 to each adjacent pixel in the x and y directions.

In a more sophisticated system filters can be used which detect the magnitude of discontinuities in the x and y directions and in response to these switch in airbrush filters which provide a smoothing effect in the direction of the discontinuities.

In this the outputs of all the threshold detectors are monitored and a smoothing filter is selected in accordance with the direction of the discontinuity. If a discontinuity only appears in the x direction then smoothing will only be performed in the x direction. Correspondingly a discontinuity in the y direction will be smoothed in the y direction. The smoothing filter used can be selected with reference to a look-up table. Alternatively the filter direction could be calculated in dependence on the direction of the fracture detected.

It will be clear to those skilled in the art that although the present invention can be implemented in dedicated hardware it can also be implemented purely in software.

What is claimed is:

1. A method of improving a video image by detecting, and compensating for, discontinuities in a motion-compensated composite picture generated from a plurality of input fields, wherein the discontinuities arise from differential motions between adjacent areas of an input field, comprising the steps of:

assigning motion vectors to elementary areas of each of a plurality of input fields in a sequence of video images;

generating a shift field from a time projection of the motion vectors assigned to at least one of the plurality of input fields in the sequence of video images, detecting transitions in displacement in the shift field between adjacent areas of the shift field, and disguising, by use of a filter, any transition detected.

2. A method according to claim 1, in which only transitions above a predetermined threshold are detected.

3. A method according to claim 1 in which the step of disguising a transition comprises applying a softening filter to areas of the composite picture corresponding to any detected transition.

4. A method according to claim 3, in which a softening filter is only applied to a transition detected from an output field which contributes more than a predetermined proportion of the output field.

5. A method according to any one of the preceding claims, further comprising the step of detecting the direction of any discontinuity which is detected.

6. A method according to claim 5, in which the softening filter is applied in a particular direction, which direction is dependent on the direction of the discontinuity.

7. A method according to claim 1, in which the shift field generated comprises a shifted vector field.

8. An apparatus for improving a video image by detecting, and compensating for, discontinuities in a motion-compensated composite picture generated from a plurality of input fields wherein the discontinuities arise from differential motion between adjacent areas of an input filed comprising means for assigning motion vectors to elementary areas of each input field in a sequence of video images;

means for generating a shift field from a time projection of the motion vectors assigned to at least one of the plurality of input fields, means for detecting transitions in the vectors of the shift field between adjacent areas of the shift field and means for disguising any transition detected by filtering at that transition, prior to display of a motion-compensated picture.

9. An apparatus for detecting discontinuities in a motion-compensated composite picture, generated from a plurality of input fields, according to claim 8, in which the detecting means comprises differentiating filter means, receiving the shift field, and means for generating a control signal when the output of the filter means exceeds a predetermined level.

10. An apparatus, for detecting discontinuities in a motion-compensated composite picture generated from a plurality of input fields according to claim 8 or 9, in which the shift field comprises a shifted vector field.

11. An apparatus according to claim 9 for detecting discontinuities in a motion-compensated composite picture generated from a plurality of input fields, including means responsive to the control signal to apply a softening filter to an area of the composite picture.

* * * * *